United States Patent
Oveyssi

(10) Patent No.: US 6,816,342 B1
(45) Date of Patent: Nov. 9, 2004

(54) DISK DRIVE INCLUDING A PAIR OF ACTUATOR COILS EACH WITH A RADIAL SEGMENT GENERALLY PERPENDICULAR TO INNER AND OUTER SEGMENTS AND OVERLAPPING WITH INNER AND OUTER MAGNETS

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 134 days.

(21) Appl. No.: 10/355,501

(22) Filed: Jan. 31, 2003

(51) Int. Cl.[7] ................................................. G11B 5/55
(52) U.S. Cl. ..................... 360/265; 360/264.9
(58) Field of Search .............................. 360/265, 264.9

(56) References Cited

U.S. PATENT DOCUMENTS

| | | | |
|---|---|---|---|
| 5,295,031 A | 3/1994 | Wasson | |
| 5,523,911 A | 6/1996 | Mita et al. | |
| 5,621,591 A | * | 4/1997 | Rahimi et al. ............. 360/265 |
| 5,764,441 A | | 6/1998 | Aruga et al. |
| 6,104,581 A | | 8/2000 | Huang et al. |
| 6,225,712 B1 | * | 5/2001 | Miyamoto et al. .......... 360/265 |
| 6,633,457 B1 | * | 10/2003 | Lin et al. ................ 360/264.9 |
| 6,768,614 B2 | * | 7/2004 | Chang et al. ............... 360/265 |

* cited by examiner

Primary Examiner—Robert S. Tupper
(74) Attorney, Agent, or Firm—Won Tae C. Kim, Esq.; Milad G. Shara, Esq.; Stetina Brunda Garred & Brucker

(57) ABSTRACT

A disk drive includes a magnetic element having an inner magnet and an outer magnet. The disk drive further includes a first coil. The first coil includes a first coil inner segment, a first coil outer segment, and a first coil radial segment disposed generally perpendicular to the first coil inner segment and the first coil outer segment. The first coil radial segment overlaps the inner and outer magnets within a magnet periphery throughout a fill range of motion of the actuator. The disk drive further includes a second coil. The second coil includes a second coil inner segment, a second coil outer segment, and a second coil radial segment disposed generally parallel to the first coil radial segment. The second coil radial segment overlaps the inner and outer magnets within the magnet periphery throughout the full range of motion of the actuator.

10 Claims, 4 Drawing Sheets

DISK DRIVE INCLUDING A PAIR OF ACTUATOR COILS EACH WITH A RADIAL SEGMENT GENERALLY PERPENDICULAR TO INNER AND OUTER SEGMENTS AND OVERLAPPING WITH INNER AND OUTER MAGNETS

BACKGROUND OF THE INVENTION

Cross-Reference to Related Applications

Not applicable.

1. Field of the Invention

The present invention relates generally to disk drives, and in particular to a disk drive including a pair of actuator coils each with a radial segment generally perpendicular to inner and outer segments and overlapping with inner and outer magnets.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub. The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body. A head gimbal assembly includes a transducer head, typically a magnetoresistive ("MR") head, which is distally attached to each of the actuator arms. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both along data annular regions. As such, the head stack assembly may be pivoted such that each transducer head is disposed adjacent the various data annular regions from adjacent the outer diameter to the inner diameter of each disk.

The actuator assembly has various natural modes of vibration. One such mode is referred to as a "butterfly" mode or the first principal bending mode. During such a butterfly mode, the actuator arms and the coil support slightly flex or bend toward and away from each other in a plane orthogonal to the axis of rotation and the heads move away from its position on the disk. This is due to those electromagnetic forces in a direction perpendicular to a longitudinal axis of the actuator produced by the current through the coil and the electromagnetic forces interaction with the magnetic fields of the magnets. Thus, if the natural frequency of the butterfly mode is 5 kilo hertz and the applied current into the coil has a 5 kilo hertz component, then this will result in the potential for undesirable excitation of the butterfly mode. While a filter, such as a notch filter, may be used to remove the frequency component corresponding to the natural frequency of the butterfly mode, that may negatively impact the capability of the actuator servo control system by reducing its bandwidth. Accordingly, there is a need in the art for a disk drive having an improved actuator coil and magnet design in comparison to the prior art.

SUMMARY OF THE INVENTION

An aspect of the present invention can be regarded as a disk drive including a disk drive base. The disk drive further includes an actuator rotatably coupled to the disk drive base. The actuator includes an actuator body configured to pivot about an axis of rotation and a coil support extending from the actuator body. The disk drive further includes a magnetic element coupled to the disk drive base and defining a magnet periphery. The magnetic element includes an inner magnet and an outer magnet disposed adjacent the inner magnet radially further from the axis of rotation. The outer magnet has a field direction opposite the inner magnet.

Further, the disk drive includes a first coil attached to the coil support. The first coil includes a first coil inner segment disposed adjacent the inner magnet, a first coil outer segment disposed adjacent the outer magnet, and a first coil radial segment disposed generally perpendicular to and electrically connecting the first coil inner segment and the first coil outer segment. The first coil radial segment overlaps the inner and outer magnets within the magnet periphery throughout a full range of motion of the actuator. The disk drive further includes a second coil attached to the coil support. The second coil includes a second coil inner segment disposed adjacent the inner magnet, a second coil outer segment disposed adjacent the outer magnet, and a second coil radial segment disposed generally parallel to the first coil radial segment and electrically connecting the second coil inner segment and the second coil outer segment. The second coil radial segment overlaps the inner and outer magnets within the magnet periphery throughout the full range of motion of the actuator.

According to various embodiments, the actuator may define an actuator longitudinal axis disposed orthogonal to the axis of rotation, the first coil inner segment, the first coil outer segment, the second coil inner segment and the second coil outer segment are disposed generally perpendicular to the actuator longitudinal axis. The first coil radial segment and the second coil radial segment are disposed generally perpendicular to the actuator longitudinal axis. The first coil may include a first coil transition segment electrically connecting the first coil inner segment and the first coil outer segment. The first coil transition segment is disposed beyond the magnet periphery. The second coil includes a second coil transition segment electrically connecting the second coil inner segment and the second coil outer segment. The second coil transition segment is disposed beyond the magnet periphery.

In addition, the actuator may have a nominal position, and the magnetic element may be symmetric with respect to the actuator longitudinal axis with the actuator in the nominal position. The disk drive may further include a magnet interface disposed between the inner and outer magnets. The magnet interface intersects the first and second coil radial segments at the same location along the first and second coil radial segments throughout the full range of motion of the actuator. The magnet interface may be arc shaped adjacent the first and second coil radial segments throughout the full range of motion of the actuator. The first coil inner segment, the first coil outer segment, second coil inner segment, and the second coil outer segment may be disposed overlapping within the magnet periphery throughout the full range of motion of the actuator. The first coil inner segment may have a length longer than a length of the first coil outer segment, and the second coil inner segment may have a length longer than a length of the second coil outer segment. The magnetic element may be a first magnetic element, and the disk drive further includes a second magnetic element with the first and second coils disposed between the first and second magnetic elements. The first and second coils may define a single coil.

DESCRIPTION OF THE PREFERRED EMBODIMENTS

Figure 1:
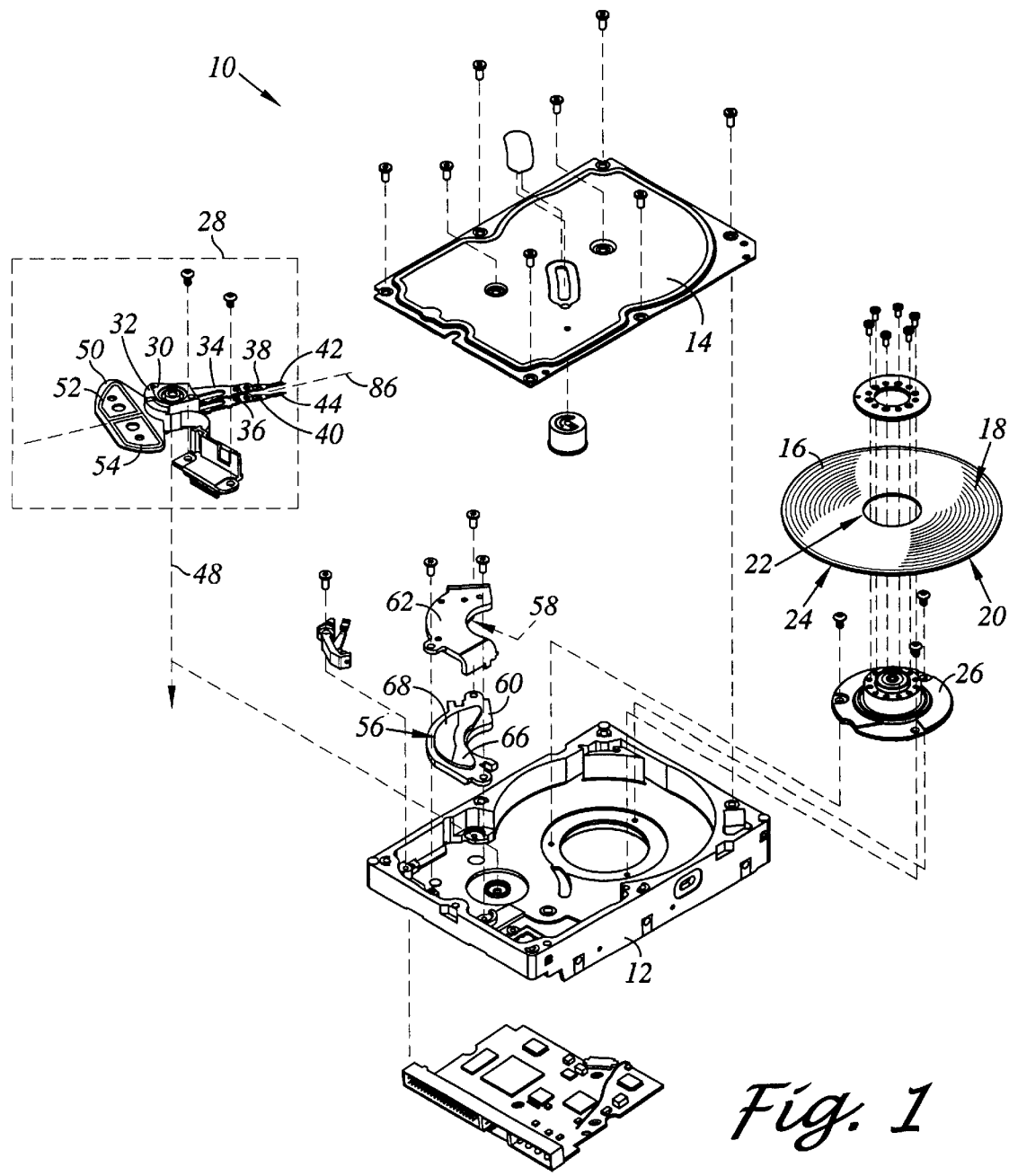
FIG. 1 is an exploded perspective view of a disk drive including an actuator with a coil support supporting a pair of actuator coils as constructed in accordance with the present invention.

Referring now to the drawings wherein the showings are for purposes of illustrating preferred embodiments of the present invention only, and not for purposes of limiting the same, FIGS. 1–7 illustrate a disk drive in accordance with the aspects of the present invention.

Referring now to FIG. 1, there is depicted an exploded perspective view of a disk drive 10 as constructed in accordance with an aspect of the present invention. The disk drive 10 includes a head disk assembly (HDA) and a printed circuit board assembly (PCBA). The head disk assembly includes a disk drive base 12 and a cover 14 that collectively house at least one magnetic disk 16. The disk 16 contains a plurality of tracks for storing data. The tracks are disposed upon opposing first and second disk surfaces 18, 20 of the disk 16 that extend between an inner disk edge 22 (associated with the inner diameter) and an outer disk edge 24 (associated with the outer diameter) of the disk 16. The head disk assembly further includes a spindle motor 26 for rotating the disk 16. The head disk assembly further includes a head stack assembly 28 rotatably attached to the disk drive base 12 in operable communication with the disk 16. The head stack assembly 28 includes a rotatable actuator 30. In the embodiment shown, the actuator 30 includes an actuator body 32 and first and second actuator arms 34, 36 that extend from the actuator body 32. Distally attached to the first and second actuator arms 34, 36 are first and second suspensions 38, 40. The first and second suspensions 38, 40 respectively support transducer heads 42, 44. It is contemplated that the number of actuator arms may vary depending upon the number of disks and disk surfaces utilized.

The actuator body 32 includes a bore, and the actuator 30 further includes a pivot bearing cartridge 46 engaged within the bore for facilitating the actuator body 32 to rotate between limited positions about an axis of rotation 48. The actuator 30 further includes a coil support 50 that extends from one side of the actuator body 32 opposite the first and second actuator arms 34, 36. In this embodiment, the coil support 50 is configured to support first and second coils 52, 54. A pair of magnetic elements 56, 58 is supported to mounts 60, 62 which are attached to the disk drive base 16 (magnetic element 58 is indicated by the dashed lead line and it is understood the magnetic element 58 is disposed underneath the mount 62). The magnetic elements 56, 58 may be attached to the disk drive base 12 through other arrangements, such as the magnetic element 58 being directly mounted to the cover 12 which is mechanically engaged with the disk drive base 12. The first and second coils 52, 54 interact with the magnetic elements 56, 58 to form a voice coil motor for controllably rotating the actuator 30.

Figure 2:
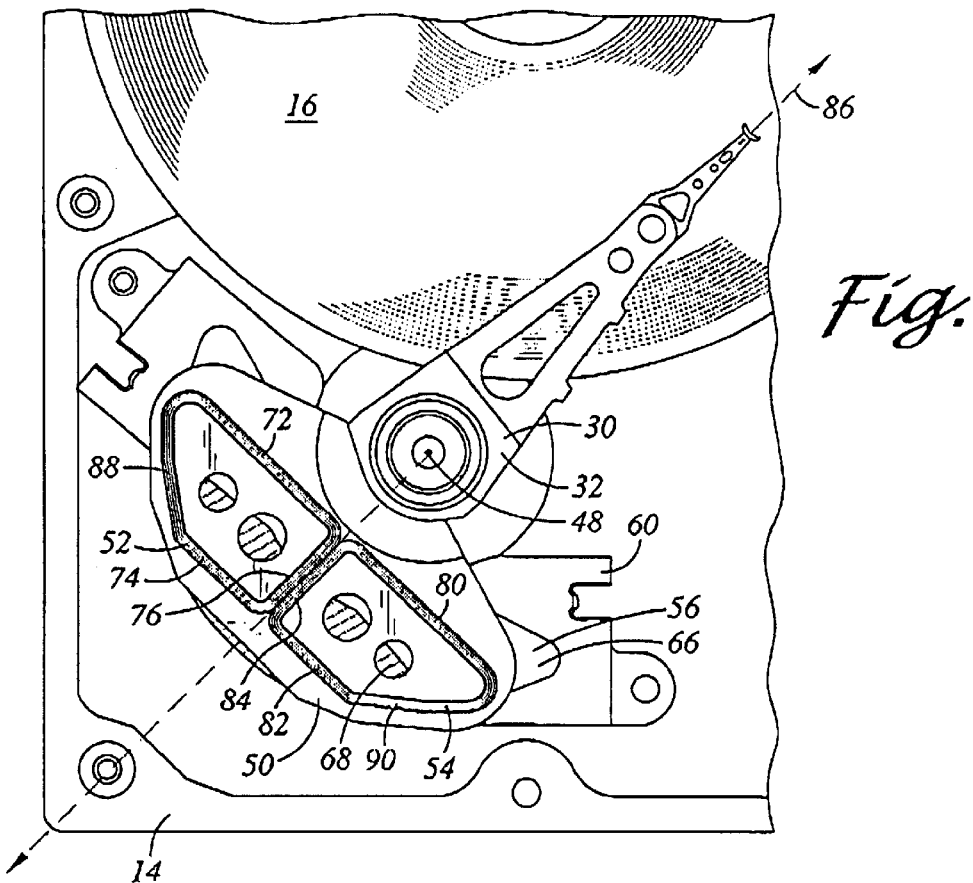
FIG. 2 is an enlarged plan view of the actuator as shown generally assembled with a portion of a disk drive base, a magnetic disk, and a magnetic element of FIG. 1.
Figure 3:
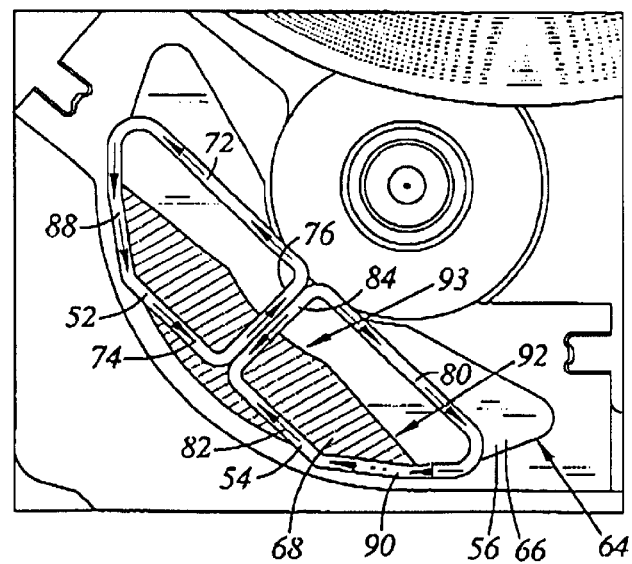
FIG. 3 is an enlarged plan view of a portion of FIG. 2 depicting the pair of actuator coils in relation to the magnetic element.

Referring additionally to FIG. 2, there is depicted an enlarged plan view of the actuator 30 as shown generally assembled with a portion of the disk drive base 12, a portion of the magnetic disk 16, and the magnetic element 56 of FIG. 1. FIG. 3 is an enlarged plan view of a portion of FIG. 2 depicting the first and second coils 52, 54 in relation to the magnetic element 56. For ease of discussion, in this figure the remaining portions of the actuator 30 are not depicted, such as the actuator body 32 and the coil support 50.

An aspect of the present invention can be regarded as the disk drive 10 including a disk drive base 12. The disk drive 10 further includes the actuator 30 rotatably coupled to the disk drive base 12. The actuator 30 includes an actuator body 32 configured to pivot about the axis of rotation 48. The actuator 30 further includes the coil support 50 extending from the actuator body 32. The disk drive 10 further includes a magnetic element, such as the magnetic element 56 of the magnetic elements 56, 58. The magnetic element 56 is coupled to the disk drive base 12 and defines a magnet periphery 64. The magnetic element 56 includes an inner magnet 66 and an outer magnet 68 disposed adjacent the inner magnet 66 radially further from the axis of rotation 48. The outer magnet 68 has a field direction opposite the inner magnet 66.

Further, the disk drive 10 includes the first coil 52 attached to the coil support 50. The first coil 52 includes a first coil inner segment 72 disposed adjacent the inner magnet 66, a first coil outer segment 74 disposed adjacent the outer magnet 68, and a first coil radial segment 76 disposed generally perpendicular to and electrically connecting the first coil inner segment 72 and the first coil outer segment 74. The first coil radial segment 76 overlaps the inner and outer magnets 66, 68 within the magnet periphery 64 throughout a full range of motion of the actuator 30. The disk drive 10 further includes the second coil 54 attached to the coil support 50. The second coil 54 includes a second coil inner segment 80 disposed adjacent the inner magnet 66, a second coil outer segment 82 disposed adjacent the outer magnet 68, and a second coil radial segment 84 disposed generally parallel to the first coil radial segment 76 and electrically connecting the second coil inner segment 80 and the second coil outer segment 82. The second coil radial segment 84 overlaps the inner and outer magnets 66, 68 within the magnet periphery 64 throughout the full range of motion of the actuator 30.

It is contemplated that the first coil inner segment 72 blends into or is otherwise integrated with the first coil radial segment 76. Likewise, the first coil radial segment 76 blends into or is otherwise integrated with the first coil outer segment 74. Similarly, the second coil inner segment 80 blends into or is otherwise integrated with the second coil radial segment 84, and the second coil radial segment 84 blends into or is otherwise integrated with the second coil outer segment 82. In this respect, as the various adjacent segments are disposed angularly with respect to each other, it is understood that at such segments include rounded portions at the ends thereof. Thus for example, the first coil radial segment 76 has ends which start to become curved as each of the ends respectively transition to the adjacent first coil inner segment 72 and the first coil outer segment 74. As described above, the first coil radial segment 76 is disposed generally perpendicular to the first coil inner segment 72 and the first coil outer segment 74. In this regard as the ends of the first coil radial segment 76 are curved, it is understood that all of the first coil radial segment 76 is not completely perpendicular with the first coil inner segment 72 and the first coil outer segment 74, and that as used herein being generally perpendicular refers to a majority of the given segment being perpendicular. Similarly, as used herein being generally parallel refers to a majority of the given segment being parallel.

As used herein, a full range of motion of the actuator 30 refers to a range of motion of the actuator 30 such that the transducer heads 42, 44 move between an inner diameter ("ID") data track adjacent the inner disk edge 22 to an outer diameter ("OD") data track adjacent the outer disk edge 20, with the ID and OD data tracks generally defining a recording surface of the disk 16.

According to various embodiments, the first coil inner segment 72 may have a length longer than a length of the first coil outer segment 74, and the second coil inner segment 80 may have a length longer than a length of the second coil outer segment 82 as seen in FIG. 2. The actuator 30 may define an actuator longitudinal axis 86 disposed orthogonal to the axis of rotation 48. In the embodiment shown, the first coil inner segment 72, the first coil outer segment 74, the second coil inner segment 80 and the second coil outer segment 82 are disposed generally perpendicular to the actuator longitudinal axis 86. Further, the first coil radial segment 76 and the second coil radial segment 84 are disposed generally parallel to the actuator longitudinal axis 86. Such generally perpendicular and generally parallel arrangement facilitates a design that produces a total electromagnetic force associated with the first and second coils 52, 54 applied to the actuator 30 of almost zero or at least of a non-substantial nature with respect to excitation of the butterfly mode of the actuator 30 during nominal operating conditions. Significantly, while mitigation of such total electromagnetic force may be achieved with such a configuration, it is understood that such configuration facilitates production of torque upon actuator 30.

As best seen in FIG. 3, the first coil inner segment 72, the first coil outer segment 74, second coil inner segment 80, and the second coil outer segment 82 may be disposed overlapping within the magnet periphery 64 throughout the full range of motion of the actuator 30. In this regard, the first coil inner segment 72, the first coil outer segment 74, the second coil inner segment 80, and the second coil outer segment 82 are configured to remain fully exposed to the respective magnetic fields associated with the inner and outer magnets 66, 68. As used herein being disposed overlapping within the magnet periphery 64 refers to a majority of each of the first coil inner segment 72, the first coil outer segment 74, the second coil inner segment 80, and the second coil outer segment 82 being inside of the magnet periphery 64 when overlaid in a plane orthogonal to the axis of rotation 48 such as viewed in FIG. 3.

In addition, the first coil 52 may include a first coil transition segment 88 electrically connecting the first coil inner segment 72 and the first coil outer segment 74. The first coil transition segment 88 is disposed beyond the magnet periphery 64. Similarly, the second coil 54 may include a second coil transition segment 90 electrically connecting the second coil inner segment 80 and the second coil outer segment 82. The second coil transition segment 90 is disposed beyond the magnet periphery 64. As used herein being disposed beyond the magnet periphery 64 refers to a majority of each of the first and second coil transition segments 88, 90 being outside of the magnet periphery 64 when overlaid in a plane orthogonal to the axis of rotation 48 such as viewed in FIG. 3. The first and second coil transition segments 88, 90 may be configured to be disposed at angles other than aligned with the actuator longitudinal axis 86 or perpendicular thereto. In this respect by being disposed beyond the magnet periphery 64 the first and second coil transition segments 88, 90 are designed not contribute to any significant electromagnetic forces upon the actuator 30 in comparison to those other portions of the first and second coils 52, 54 which are disposed overlapping within the magnet periphery 64.

It is contemplated that first and second coils 52, 54 may define a single coil. The current flow through the first and second coils 52, 54 are in opposing clockwise and counter-clockwise directions as indicted with arrows in FIG. 3. As shown, the first coil 52 has a current indicated as flowing counter-clockwise and the second coil 54 has a current indicated as flowing clockwise. It is understood that such flow directions may both be changed so as to cause the actuator 30 to pivot in an opposite direction. In addition, the actuator 30 may have a nominal position. The magnetic element 56 may be symmetric with respect to the actuator longitudinal axis 86 with the actuator 30 in the nominal position such as seen in FIGS. 2 and 3. Such a nominal position may correspond to the actuator 30 being disposed such that the transducer heads 42, 44 are halfway between an inner diameter ("ID") data track adjacent the inner disk edge 22 and an outer diameter ("OD") data track adjacent the outer disk edge 20, with the ID and OD data tracks generally defining a recording surface of the disk 16.

The disk drive 10 may further include a magnet interface 92 disposed between the inner and outer magnets 66, 68 as seen in FIG. 3. The magnet interface 92 intersects the first and second coil radial segments 76, 84 at the same location along the first and second coil radial segments 76, 84 throughout the full range of motion of the actuator 30. The magnet interface 92 may be arc shaped adjacent the first and second coil radial segments 76, 84 throughout the full range of motion of the actuator 30 as indicated by reference numeral 93. Such indicated arced shaped portion 93 may be defined by a radius from the axis of rotation 48. In this regard, the arc shaped nature of the magnet interface 92 is contemplated to facilitate the magnet interface 92 to intersect the first and second coil radial segments 76, 84 at the same location along the first and second coil radial segments 76, 84 throughout the full range of motion of the actuator 30. This ensures that each of the first and second coil radial segments 76, 84 overlaps the inner and outer magnets 66, 68 within the magnet periphery 64 throughout the full range of motion of the actuator 30. Moreover, as further discussed below, this arrangement facilitates that the electromagnetic forces exerted upon the various portions of the first and second coil radial segments 76, 84 respectively adjacent the inner and outer magnets 66, 68 remain generally constant in relation to a coordinate system including the actuator longitudinal axis 86. Such electromagnetic forces tend to cancel each other. As a result, this particular configuration facilitates a relatively constant torque producing capability throughout the full range of motion of the actuator 30.

Figure 4:
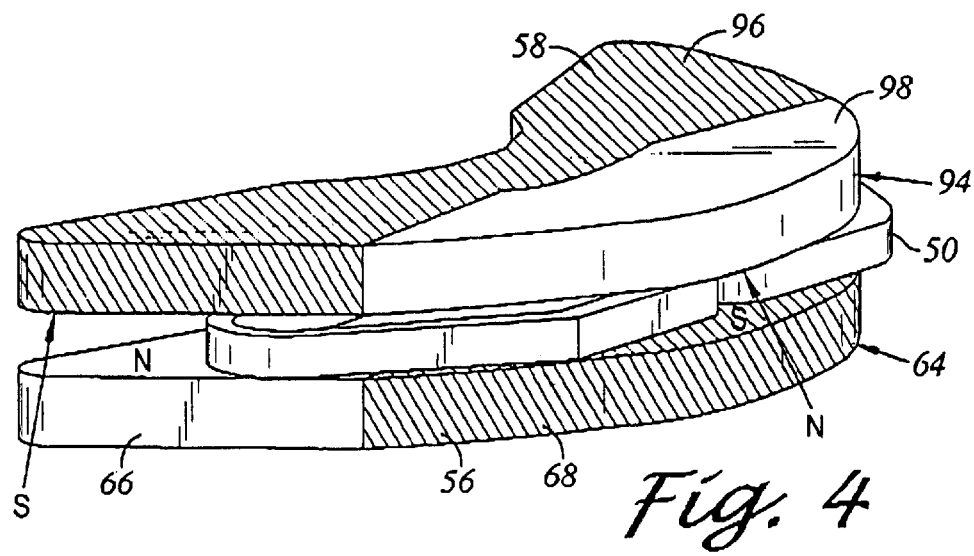
FIG. 4 is a perspective view of the coil support and coils as shown in relation to magnetic elements.
Figure 5:
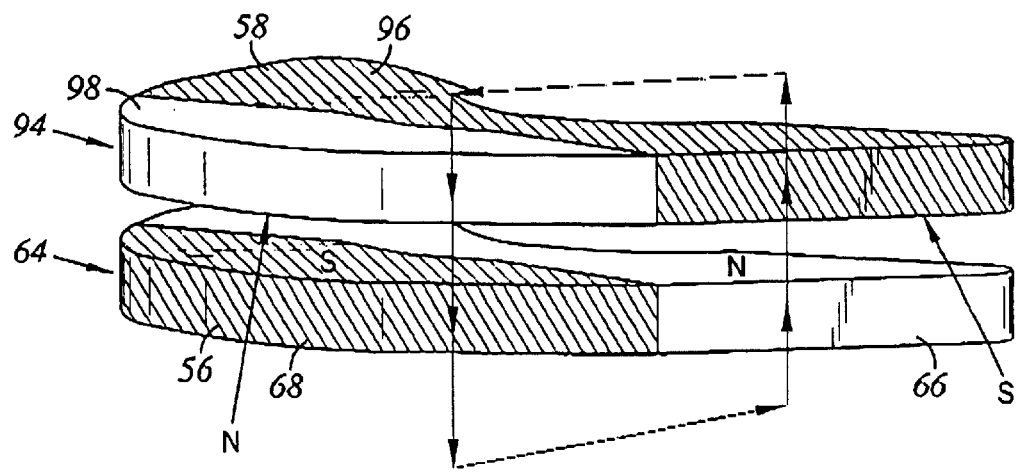
FIG. 5 is a perspective view of the magnetic elements of FIG. 4 as seen from another angle as shown with symbolic magnetic flux lines.

As mentioned above the disk drive 10 may include a magnetic element 58, in addition to the magnetic element 56. The first and second coils 52, 54 are disposed between the magnetic elements 56, 58. In this regard, FIG. 4 is a perspective view of the coil support 50 as shown in relation to the magnetic elements 56, 58 with the actuator 30 in the nominal position. Like the magnetic element 56, the magnetic element 58 defines a magnet periphery 94. The magnetic element 58 includes an inner magnet 96 and an outer magnet 98 disposed adjacent the inner magnet 96 radially further from the axis of rotation 48. The outer magnet 98 has a field direction opposite the inner magnet 96. The magnetic elements 56, 58 are generally aligned with the inner magnets 66, 96 disposed adjacent each other and the outer magnets 68, 98 disposed adjacent each other. Further the magnet peripheries 64, 94 are in alignment. Moreover, the inner magnets 66, 96 may have opposing field directions and the outer magnets 68, 98 may have opposing field directions. For example, the inner magnet 66 may have an N-type polarity adjacent the coil support 50 and the inner magnet 96 may have an S-type polarity adjacent the coil support 50. Similarly, the outer magnet 68 may have an S-type polarity adjacent the coil support 50 and the outer magnet 98 may have an N-type polarity adjacent the coil support 50. FIG. 5 is a perspective view of the magnetic elements 56, 58 of FIG. 4 as seen from another angle as shown with symbolic magnetic flux lines. It is understood that such flux lines correspond to the particular magnetic polarities indicated.

While the magnetic element 56 may be formed of two magnets (the inner magnet 66 and the outer magnet 68), it is understood that the magnetic element 56 may be a single magnet with the inner magnet 66 and the outer magnet 68 being associated with poles of the magnetic element 56. Similarly it is understood that the magnetic element 58 may be a single magnet with the inner magnet 96 and the outer magnet 98 being associated with poles of the magnetic element 58.

Figure 6:
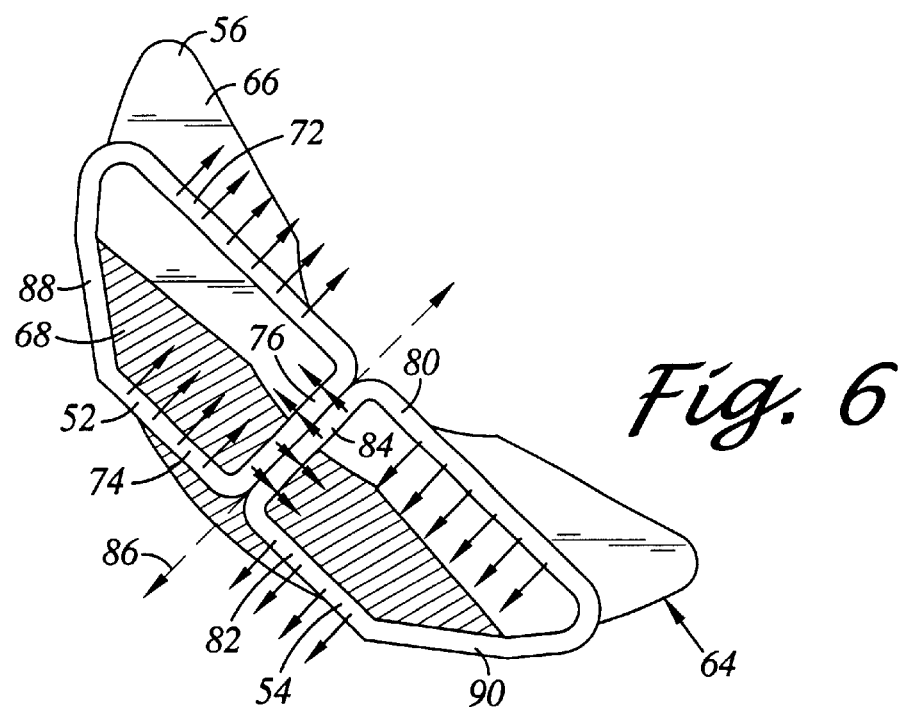
FIG. 6 is a plan view of the coils in relation to the magnetic element of the FIG. 3 as shown with symbolic force lines associated with various portions of the coils.
Figure 7:
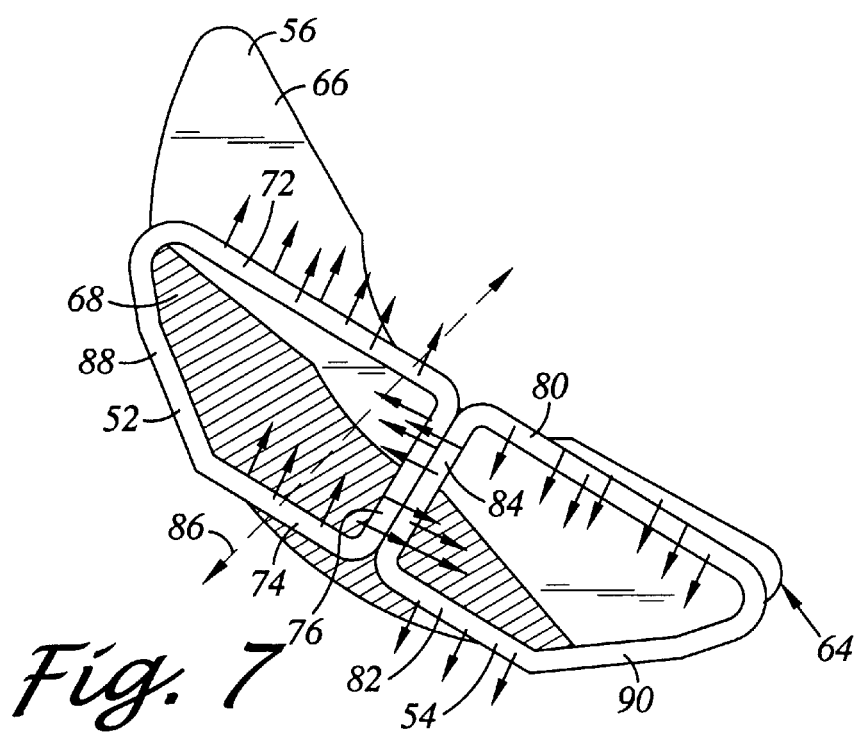
FIG. 7 is a plan view of the coils and magnetic element of FIG. 6, however, with the coil rotated in relation to the magnetic element.

Referring now to FIG. 6, the first and second coils 52, 54 are shown in relation to the magnetic element 56 associated with the actuator 30 being in a nominal position. Symbolic electromagnetic force lines are indicated associated with the various segments of the first and second coils 52, 54 due to interaction with the magnetic element 56. As can be appreciated, the sum of the electromagnetic forces is almost zero or at least of a non-substantial nature with respect to excitation of the butterfly mode of the actuator 30 during nominal operating conditions. Nonetheless, such configuration facilitates production of torque upon actuator 30. As such, this design is contemplated to have a mitigated propensity to excite the butterfly mode of the actuator 30 due to application of current needed to produce torque upon the actuator 30. Moreover, as the sum of the electromagnetic forces is almost zero it is further contemplated to be energy efficient. As seen in FIG. 7, the first and second coils 52, 54 are shown in relation to the magnetic element 56 associated with the actuator 30 being in a pivoted position associated with the transducer heads 42, 44 being adjacent the inner disk edge 22 of the disk 16. Symbolic electromagnetic force lines are indicted associated with the various segments of the first and second coils 52, 54 due to interaction with the magnetic element 56 while the first and second coils 52, 54 are in this position. As such, as can be appreciated, the sum of the electromagnetic forces result is almost zero or at least of a non-substantial nature with respect to excitation of the butterfly mode of the actuator 30 during nominal operating conditions throughout the full range of motion of the actuator 30.

I claim:

1. A disk drive comprising:
   a disk drive base;
   an actuator rotatably coupled to the disk drive base, the actuator including an actuator body configured to pivot about an axis of rotation and a coil support extending from the actuator body;
   a magnetic element coupled to the disk drive base and defining a magnet periphery, the magnetic element including an inner magnet and an outer magnet disposed adjacent the inner magnet radially further from the axis of rotation, the outer magnet having a field direction opposite the inner magnet;
   a first coil attached to the coil support, the first coil including:
      a first coil inner segment disposed adjacent the inner magnet;
      a first coil outer segment disposed adjacent the outer magnet; and
      a first coil radial segment disposed generally perpendicular to and electrically connecting the first coil inner segment and the first coil outer segment, the first coil radial segment overlapping the inner and outer magnets within the magnet periphery throughout a full range of motion of the actuator; and
   a second coil attached to the coil support, the second coil including:
      a second coil inner segment disposed adjacent the inner magnet;
      a second coil outer segment disposed adjacent the outer magnet; and
      a second coil radial segment disposed generally parallel to the first coil radial segment and electrically connecting the second coil inner segment and the second coil outer segment, the second coil radial segment overlapping the inner and outer magnets within the magnet periphery throughout the full range of motion of the actuator.

2. The disk drive of claim 1 wherein the actuator defines an actuator longitudinal axis disposed orthogonal to the axis of rotation, the first coil inner segment, the first coil outer segment, the second coil inner segment and the second coil outer segment are disposed generally perpendicular to the actuator longitudinal axis, the first coil radial segment and the second coil radial segment are disposed generally perpendicular to the actuator longitudinal axis.

3. The disk drive of claim 1 wherein the first coil includes a first coil transition segment electrically connecting the first coil inner segment and the first coil outer segment, the first coil transition segment is disposed beyond the magnet periphery, the second coil includes a second coil transition segment electrically connecting the second coil inner segment and the second coil outer segment, the second coil transition segment is disposed beyond the magnet periphery.

4. The disk drive of claim 1 wherein the actuator has a nominal position, the magnetic element is symmetric with respect to the actuator longitudinal axis with the actuator in the nominal position.

5. The disk drive of claim 1 further includes a magnet interface disposed between the inner and outer magnets, the magnet interface intersects the first and second coil radial segments at the same location along the first and second coil radial segments throughout the full range of motion of the actuator.

6. The disk drive of claim 2 wherein the magnet interface is arc shaped adjacent the first and second coil radial segments throughout the full range of motion of the actuator.

7. The disk drive of claim 1 wherein the first coil inner segment, the first coil outer segment, second coil inner segment, and the second coil outer segment are disposed overlapping within the magnet periphery throughout the full range of motion of the actuator.

8. The disk drive of claim 1 wherein the first coil inner segment has a length longer than a length of the first coil outer segment, the second coil inner segment has a length longer than a length of the second coil outer segment.

9. The disk drive of claim 1 wherein the magnetic element is a first magnetic element, the disk drive further includes a second magnetic element, the first and second coils are disposed between the first and second magnetic elements.

10. The disk drive of claim 1 wherein the first and second coils define a single coil.

* * * * *